May 17, 1949.  L. ROBERTS  2,470,647
ARMATURE CONSTRUCTION FOR DYNAMOELECTRIC MACHINES
Filed Aug. 21, 1947
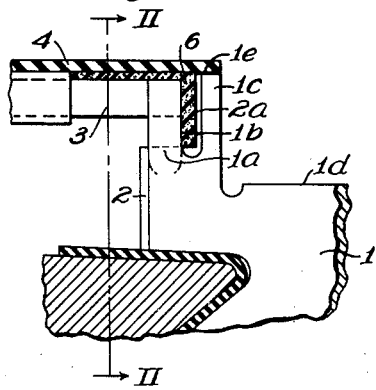
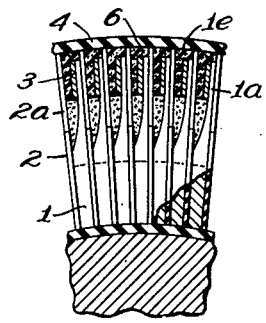
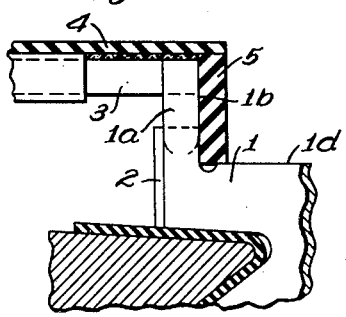
WITNESSES:
Robert C. Baird
INVENTOR
Leslie Roberts.
BY
ATTORNEY Patented May 17, 1949

2,470,647

UNITED STATES PATENT OFFICE 2,470,647

ARMATURE CONSTRUCTION FOR DYNAMO-ELECTRIC MACHINES

Leslie Roberts, Bradford, England, assignor to The English Electric Company, Limited, London, England, a British company Application August 21, 1947, Serial No. 769,932
In Great Britain September 10, 1941

Section 1, Public Law 690, August 8, 1946
Patent expires September 10, 1961

4 Claims. (Cl. 171—321)

The present invention relates to an armature construction for dynamo-electric machines, and more particularly to means for connecting the armature conductors to the bars or segments of a commutator.

In the manufacture of a dynamo-electric machine with a commutator, it is common practice to solder the armature conductors to some part of each commutator segment. With the increased use of insulation which will withstand higher and higher temperatures, there is a tendency for the maximum permissible temperature of the armature to be limited by the maximum temperature which the soldered joints can safely withstand. At too high a temperature the solder softens and either runs out or is thrown out by centrifugal force.

The principal object of the present invention is to provide an armature construction for dynamo-electric machines in which the armature conductors are brazed to the commutator bars or segments so that the connections between the conductors and the commutator segments will withstand relatively high temperatures.

A further object of the invention is to provide an armature construction for dynamo-electric machines in which the armature conductors are brazed to the commutator segments and in which the commutator segments are shaped to facilitate the brazing operation.

A still further object of the invention is to provide an armature construction for dynamo-electric machines in which the necks or lugs of the commutator segments are thinner than the segments themselves, leaving gaps between adjacent lugs to facilitate brazing the armature conductors to the lugs, and in which the gaps between adjacent lugs are closed on the side toward the cylindrical working surface of the commutator.

According to the present invention, the armature conductor is brazed to some part of the commutator segment by a process involving electrical heating. Furthermore, the brazing is carried out by applying electrodes immediately adjacent to the joint and so passing electric current through but limiting the current substantially to the joint. The brazed joint will safely withstand a considerably higher temperature than the usual soldered joint while the electric heating is so localized that there is little risk of the heating damaging the conductor insulation on the one hand or softening the working part of the commutator segments on the other hand.

With a cylindrical commutator the part of the segment to which the conductors are brazed is an upstanding lug thinner than the segment and to the side of which the armature conductor is brazed. The combined thickness of the lug and the conductor is less than the full thickness of the segment, in order to leave gaps for inserting the brazing electrodes; it is an important further feature of the invention to close up any entry to said gaps from the side adjacent to the cylindrical working surface of the commutator by a shield in the form of a complete cylindrical ring around the commutator between the said lugs and the working surface. In one form, some part of the said thin lug or a separate upstanding lug is made of the same thickness as the rest of the segment so that all such thick portions, with the insulation between the commutator segments, form the complete cylindrical ring. Alternatively a separate ring, which may conveniently be of heat-resisting electrically insulating material, may be placed around the commutator between the lugs and the working surface. A cylindrical enclosure or wrapping may be provided over the lugs and the ends of the conductors and over the cylindrical ring; insulation may be inserted in the gaps between the lugs and in the gaps between the bare ends of the conductors.

The invention will be more fully understood from the following detailed description, taken in connection with the accompanying drawing, in which:

Figure 1 is a fragmentary longitudinal sectional view of a portion of an armature including a portion of a cylindrical commutator;

Fig. 2 is a transverse sectional view, approximately on the line II—II of Fig. 1; and Fig. 3 is a view similar to Fig. 1 showing a modification.

The drawing shows a portion of an armature for a commutator-type dynamo-electric machine. It will be understood that the armature includes the usual laminated core on which the armature conductors are carried and that the commutator may be of any suitable construction having a plurality of bars or segments 1 disposed in a cylinder. Each commutator segment 1 is provided with an upstanding lug 1a which is considerably thinner than the rest of the segment. These segments are mounted and insulated in the usual manner and are insulated from each other by layers 2 of mica. The end of the armature conductor 3 has a flat face which is placed in contact with the flat side face of the thin lug 1a and brazed thereto.

In carrying out the invention, a brazing material such as a strip of silver solder foil or phosphor copper foil is placed between the side face of the end of conductor 3 and the adjacent side face of the lug 1a. Current is passed through these parts (in order to heat them and make the joint) by means of carbon or other electrodes, one of which bears against the side face of conductor 3 remote from the lug 1a and the other against the side face of lug 1a remote from conductor 3. The heating current is thus substantially confined to the joint. The lug 1a may be of the kind integral with the commutator segment, as shown, and formed by milling or otherwise machining away metal from one side of the lug to reduce it to less thickness than the rest of the segment. Alternatively, the lug may be of the kind formed separately and secured to the segment, e. g. by riveting or by brazing in the same manner as the conductor 3 is brazed to the lug.

The combined thickness of the lug 1a and the flat armature conductor 3 is less than the thickness of the segment 1 and accordingly space is available for the above-mentioned electrodes. The mica insulators 2 are cut back as indicated at 2a to increase the space between the lugs 1a. The latter may have to be bent temporarily to facilitate insertion of the electrodes and can be bent back again after completion of the brazing process. When all the conductors are secured to the lugs there will be gaps between each lug and the adjacent lug and the conductor secured thereto. Insulating material should be placed in these gaps in order to maintain insulation between the commutator segments. The material may be solid separating pieces which need not necessarily be of mica like the separators 2 but can, for example, be bakelised fabric packing pieces molded to shape. Such insulation can be held in position by bands around the cylinder formed by the top surfaces of the lugs 1a, or by the cylindrical enveloping hood or sleeve 4 of insulating material. There are also gaps between the adjacent bare overhanging parts of the conductors 3. To prevent the entry of dust and dirt into these latter gaps, a bag or wrapping of heat-resisting electrical insulating material such as asbestos or woven glass threads may be placed over the overhanging ends of the conductors 3, the tops of the lugs 1a and their vertical faces 1b. In the preferred embodiment of the invention, however, as an alternative to the abovementioned solid insulating packing pieces and bag of insulating material, all the above-described gaps may be filled up with an insulating paste 6, such as one containing mica dust. The commutator lugs 1a and the conductors themselves tend to key the paste 6 in position and the paste may be hardened by subsequent baking.

As a further addition and means of keeping out dust and dirt, a complete cylindrical ring is formed around the commutator, behind the lugs 1a and between them and the working surface 1d of the commutator. Thus each commutator segment may be provided, as shown in Fig. 1, with a second lug 1c standing up to at least the same height as the lug 1a but of the same thickness as the rest of the segment; this lug is nearer to the working cylindrical face 1d of the commutator than the lug 1a and preferably, as shown, may be part of lug 1a but is separated from the latter by a gap. These lugs 1c with the insulation 2 between the commutator segments together form a complete solid ring. The gaps between the lugs 1a and 1c can be filled with a packing of heat-resisting electrical insulating material such as asbestos or woven glass or by the paste 6.

Alternatively a separate ring 5 of a diameter at least equal to that of the cylinder formed by the lugs 1a may be placed over the working surface 1d of the commutator behind the lugs 1a as shown in Fig. 3. The ring 5 may conveniently be of heat-resisting electrically insulating material such as a molded material incorporating asbestos. The ring 5 can be secured in place for example by being keyed to the commutator by insulating keys or pegs let into the segments.

As another alternative, the ring 5 may be temporarily clamped around the commutator and spaced apart from the lugs 1a, the space filled with the above-mentioned insulating paste which also fills the gaps between the lugs and possibly also recesses in the segments, being thereby keyed in, and the temporary ring 5 removed; thus a cylindrical ring of insulating material is formed around the commutator behind the lugs 1a by the paste.

The cylindrical hood or sleeve 4 can be placed, as shown, around the lugs and the ends of the conductors 3 and in contact with the cylindrical face 1e of the lugs 1c, or with the peripheral surface of the ring 5 or any equivalent ring, to form a complete dust-and-dirt-proof enclosure and may be secured, for example, by a binding around it.

I claim as my invention:

1. In an armature for a dynamo-electric machine, a cylindrical commutator having a plurality of segments, each of said segments having a lug at one end thereof which is thinner than the segment, an armature conductor brazed to each of said lugs, the combined thickness of the conductor and lug being less than the thickness of the segment, insulating means substantially filling the spaces between adjacent lugs, and a ring element disposed between said lugs and the cylindrical surface of the commutator, said ring element extending radially substantially the same distance as the lugs.

2. The structure defined in claim 1 in which said ring element comprises a second lug portion on each segment of the same thickness as the segment, and insulating spacing means between said second lug portions.

3. The structure defined in claim 1 in which said ring element comprises an annular member of insulating material encircling the commutator adjacent the said lugs.

4. In an armature for a dynamo-electric machine, a cylindrical commutator having a plurality of segments, each of said segments having a lug at one end thereof which is thinner than the segment, an armature conductor brazed to each of said lugs, the combined thickness of the conductor and lug being less than the thickness of the segment, insulating means substantially filling the spaces between adjacent lugs, a ring element disposed between said lugs and the cylindrical surface of the commutator, said ring element extending radially substantially the same distance as the lugs, and a generally cylindrical insulating member covering the outer ends of the lugs and at least the end portions of the conductors.

LESLIE ROBERTS.

REFERENCES CITED

The following references are of record in the file of this patent:

UNITED STATES PATENTS

| Number | Name | Date |
|---|---|---|
| 866,262 | Coleman | Sept. 17, 1907 |
| 1,271,984 | Zabriskie | July 9, 1918 |
| 2,387,885 | Davis | Oct. 30, 1945 |

FOREIGN PATENTS

| Number | Country | Date |
|---|---|---|
| 12,228 | Great Britain | 1890 |